United States Patent
Mauer

(10) Patent No.: US 7,039,091 B1
(45) Date of Patent: May 2, 2006

(54) METHOD AND APPARATUS FOR IMPLEMENTING A TWO DIMENSIONAL CORRELATOR

(75) Inventor: Volker Mauer, High Wycombe (GB)

(73) Assignee: Altera Corporation, San Jose, CA (US)

( * ) Notice: Subject to any disclaimer, the term of this patent is extended or adjusted under 35 U.S.C. 154(b) by 766 days.

(21) Appl. No.: 09/892,051

(22) Filed: Jun. 26, 2001

Related U.S. Application Data

(60) Provisional application No. 60/291,230, filed on May 16, 2001.

(51) Int. Cl.
*H04B 7/216* (2006.01)

(52) U.S. Cl. ............... 375/140; 375/142; 375/150; 375/343; 708/314; 708/422

(58) Field of Classification Search ............... 375/140, 375/142, 143, 145, 150, 152, 335, 343, 365, 375/260, 355, 360, 361, 130, 131, 139; 708/422, 708/314

See application file for complete search history.

(56) References Cited

U.S. PATENT DOCUMENTS

| | | | |
|---|---|---|---|
| 3,604,911 A * | 9/1971 | Schmitt ............... 708/422 |
| 6,330,292 B1 * | 12/2001 | Dent et al. ............... 375/343 |
| 6,421,372 B1 * | 7/2002 | Bierly et al. ............... 375/143 |
| 6,760,363 B1 * | 7/2004 | Bettaieb ............... 375/150 |

* cited by examiner

*Primary Examiner*—Khai Tran
*Assistant Examiner*—Edith Chang
(74) *Attorney, Agent, or Firm*—L. Cho

(57) ABSTRACT

A method for managing a code sequence according to a first embodiment of the present invention is disclosed. Sets of n contiguous sample values that include sample values in a plurality of sample sequences are accessed. Sets of n contiguous coefficients are accessed. The sample values in each of the plurality of sets of sample values that are accessed are processed in parallel with corresponding coefficients that are accessed. Each of the plurality of sets of sample values are processed during a different time step.

24 Claims, 13 Drawing Sheets

| CODE SEQUENCE | 1 | -1 | -1 | 1 | 1 | -1 | -1 | -1 | | | | |
|---|---|---|---|---|---|---|---|---|---|---|---|---|
| RECEIVED SAMPLE | 5 | 2 | -1 | 3 | 6 | -6 | 3 | 2 | 8 | -3 | 7 | |

FIG. 8

| CODE SEQUENCE | 1 | -1 | -1 | 1 | 1 | -1 | -1 | | | |
|---|---|---|---|---|---|---|---|---|---|---|
| RECEIVED SAMPLE | 5 | 2 | -1 | 3 | 6 | -6 | 3 | 2 | 8 | -3 | 7 |
| LAG RESULTS | 14 | -13 | -20 | -4 | | | | | | | |

FIG. 10

METHOD AND APPARATUS FOR IMPLEMENTING A TWO DIMENSIONAL CORRELATOR

RELATED APPLICATIONS

This application claims the priority date of provisional patent application 60/291,230 filed on May 16, 2001.

FIELD OF THE INVENTION

The present invention relates to the field of correlators. More specifically, the present invention relates to a correlator architecture for determining a synchronization point for a code sequence.

BACKGROUND

Code Division Multiple Access (CDMA) and Wideband Code Division Multiple Access (W-CDMA) are wireless communication standards. In CDMA and W-CDMA, a single frequency spectrum is shared by multiple users. In order to distinguish one wireless communication device from another, a unique code sequence is associated with each wireless communication device. Matched filters have been used by wireless communication devices to identify code sequences embedded in transmitted signal samples. Matched filters have also been used to identify an amount of delay incurred for the transmission of signal samples between wireless communication devices.

There are several drawbacks associated with using matched filters. First, a large number of samples are required to be accessed in order to efficiently utilize a match filter. If input samples are stored in input memory, the memory bandwidth becomes a limiting factor. This limitation forces implementation of the sample storage in registers. However, storing data in registers is inefficient compared to storing data in specialized memory structures like RAMs. Hence, implementation of matched filters would require the hardware size of the device to be large. Furthermore, matched filters typically require very high MIPS computation power. Depending on the parameters, the matched filter can require execution of tens of billions or hundreds of billions of operations per second. The high MIPS computation power requirement of matched filters exceed the capability of a single standard digital signal processing (DSP) processor. The use of a specialized DSP processor or multiple standard DSP processors to perform the computations required costs that are high and undesirable. Conventional usage of Programmable Logic Devices (PLDs) to perform the computations required the PLDs to include a large number of logic elements for the computations and a large number of registers for storing data and results from the matched filter. This translates into a need for additional real estate and costs that are also undesirable.

Thus, what is needed is a method and apparatus for processing code sequences and transmitted samples that is efficient and cost effective.

SUMMARY OF THE INVENTION

A method for managing a code sequence according to a first embodiment of the present invention is disclosed. Sets of n contiguous sample values that include sample values in a plurality of sample sequences are accessed. Sets of n contiguous coefficients are accessed. The sample values in each of the plurality of sets of sample values are processed in parallel with corresponding coefficients. Each of the plurality of sets of sample values are processed during a different time step.

A method for managing a code sequence according to a second embodiment of the present invention is disclosed. A first set of n coefficients in the code sequence and a first set of n values in a sample are accessed during a first time step. The first set of n values is processed with coefficients in the first set of n coefficients to determine first partial accumulation results. A second set of n coefficients in the code sequence and a second set of n values in the sample are processed during a second time step. The second set of n values is processed with coefficients in the second set of n coefficients to determine second partial accumulation results. A lag result is generated for a first sequence of values from the sample from the first and consecutive partial accumulation results.

A method for managing a code sequence according to a third embodiment of the present invention is disclosed. A first set of sample values and coefficients from a first set of code sequence coefficients are processed to determine first partial accumulation results during a first time step. A second set of sample values and coefficients from a second set of code sequence coefficients are processed to determine second partial accumulation results during a second time step. The second set of sample values and coefficients from the first and second set of code sequence coefficients are processed to determine third partial accumulation results during the second time step. A lag result is generated for a first sequence of sample values in response to the first and second partial accumulation results. A lag result is generated for a second sequence of sample values in response to the first and third partial accumulation results.

A correlator unit according to the present invention is disclosed. The correlator unit includes a plurality of n sample registers that store values from a plurality of sample sequences that are processed in parallel. The plurality of n sample registers store values from one set of sample values of a plurality of sets of sample values at a time. The correlator unit includes a plurality of 2n code sequence registers that store up to 2n coefficients from a code sequence. The correlator unit includes a processing unit that processes the values in each of the plurality of sets of sample values in the plurality of n sample registers in parallel with corresponding coefficients in the plurality of 2n code sequence registers. Each of the plurality of sets of sample values is processed during a different time step.

BRIEF DESCRIPTION OF THE DRAWINGS

The features and advantages of the present invention are illustrated by way of example and are by no means intended to limit the scope of the present invention to the particular embodiments shown, and in which:

FIG. 8 is a table of an exemplary code sequence and received sample to be processed by the correlator shown in FIG. 1;

FIG. 10 is a table of an exemplary code sequence, received sample, and lag results calculated for sample sequence groups from the received sample.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well known circuits and devices are shown in block diagram form to avoid obscuring the present invention unnecessarily. Additionally, the interconnection between circuit elements or blocks may be shown as buses or as single signal lines. Each of the buses may alternatively be single signal lines, and each of the single signal lines may alternatively be buses.

Figure 1:
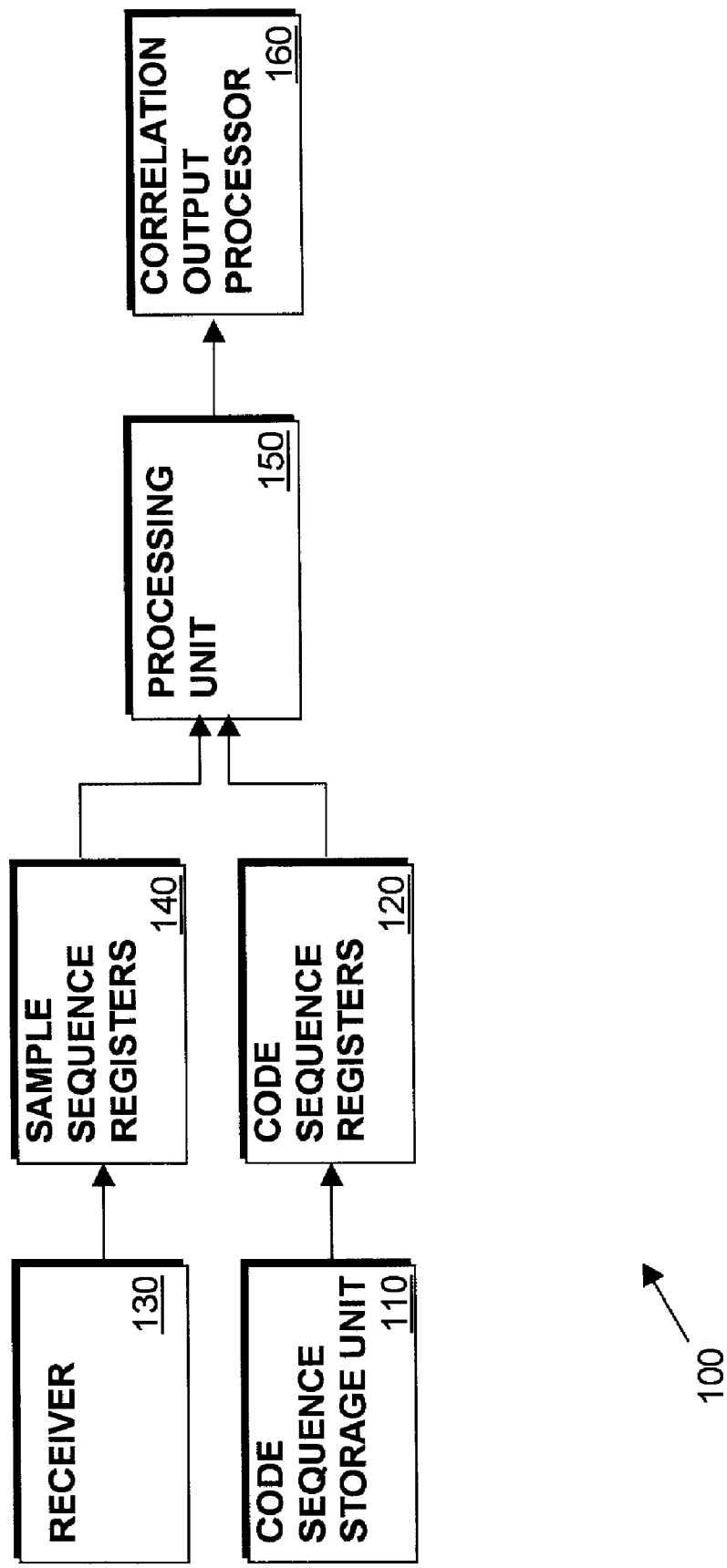
FIG. 1 is a block diagram illustrating a two dimensional correlator according to an embodiment of the present invention.

FIG. 1 is a block diagram of a two dimensional correlator 100 according to an embodiment of the present invention. The two dimensional correlator 100 may reside in a wireless communication device, a base station for a wireless communication device or other unit that manages code sequences. The two dimensional correlator 100 may operate to determine a delay in transmission of a sample between a wireless communication device and a base station by determining a synchronization point for the code sequence in the received sample.

The two dimensional correlator 100 includes a code sequence storage unit 110. The code sequence storage unit 110 stores a code sequence associated with the device. The code sequence storage 110 may be implemented by a memory, a register or other type of storage device. The code sequence includes a plurality of contiguous coefficients that may be organized into a plurality of contiguous sets of code sequence coefficients. According to an embodiment of the present invention, the code sequence includes L contiguous coefficients where a first coefficient in the code sequence is designated as being the highest order coefficient and the last coefficient in the code sequence is designated as being the lowest order coefficient. The contiguous coefficients may be organized into a plurality of contiguous sets of contiguous code sequence coefficients having n coefficients each.

The two dimensional correlator 100 includes a plurality of code sequence registers 120. The code sequence registers 120 are connected to the code sequence storage 110. The code sequence registers 120 receive sets of code sequence coefficients from the code sequence storage 110. According to an embodiment of the two dimensional correlator 100, the code sequence registers 120 may store up to two sets of code sequence coefficients at a time for processing during each system clock cycle (time step) of the two dimensional correlator 100. The code sequence registers 120 may be implemented by a shift registers or other storage device.

The two dimensional correlator 100 includes a receiver 130. The receiver 130 receives samples from a communication device (not shown). The receiver 130 may include an analog to digital converter and a storage device. The samples include a plurality of contiguous sample values. The samples may be organized into a plurality of sample sequences where each sample sequence includes a contiguous subset of L sample values from the samples. The first sample value in the sample sequence may be designated as being the highest order sample value and the last sample value in the sample sequence may be designated as being the lowest order sample value. According to an embodiment of the present invention, a first sample value in a first sample sequence includes a first sample value in the sample and each consecutive sample sequence includes a next contiguous sample value in the sample as a first sample value in the consecutive sample sequence. The samples may also be organized into a plurality of contiguous sets of contiguous sample values having n sample values each. Each sample value in a sample sequence corresponds to a coefficient in a code sequence of the same order.

The two dimensional correlator 100 includes a plurality of sample sequence registers 140. The sample sequence registers 140 are coupled to the receiver 130. The sample sequence registers 140 receive sets of sample values from the receiver 130. A set of sample values may include sample values from a plurality of $N_{par\_sample}$ sample sequences that are processed in parallel. The sample sequence registers 140 may store sample values from one set of sample values at a time for processing during each time step. The sample sequence registers 140 may be implemented by a register or other storage device.

According to an embodiment of the two dimensional correlator 100, the coefficients from the code sequence storage unit 110 and the sample values from the receiver 130 are stored in internal block memories (embedded system blocks or embedded array blocks). In this embodiment, there are no latency issues for context switching. It is possible to switch a next set of sample values from the receiver 130 into the sample sequence registers 140 for processing or to switch a next set of coefficients from the code sequence storage unit 110 into the code sequence registers 120 for processing immediately at the next time step.

The two dimensional correlator 100 includes a processing unit 150. The processing unit 150 generates a set of correlation outputs ("lag result") for each sample sequence in the receiver 130. According to an embodiment of the two dimensional correlator 100, the processing unit 150 generates a lag result for each sample sequence by processing each sample value in a contiguous sample sequence of L sample values with a corresponding coefficient in a contiguous code sequence of L coefficients. Each set of sample values stored in the sample sequence registers 140 is processed during a different time step of the two dimensional correlator 100. The processing unit 150 processes sample values stored in the sample sequence registers 140 in parallel with corresponding coefficients stored in the code sequence registers 120 to generate partial accumulation result. According to an embodiment of the processing unit 150, a product may be taken for each sample value in the sample sequence registers 140 with its corresponding coefficient stored in the code sequence register 120 to generate a partial accumulation result. The partial accumulation results associated with a sample sequence may be summed at each time step to generate accumulation results. Lag results for a sample sequence may be determined by the summation of all the accumulation results of the sample sequence.

The two dimensional correlator 100 includes a correlation output processor 160. The correlation output processor 160 determines a synchronization point in a sample from the lag results of the sample sequences. According to an embodiment of the two dimensional correlator 100, the correlation output processor 160 determines that the first sample value of a sample sequence having a lag result with the highest numerical value is the synchronization point.

It should be appreciated that the code sequence storage unit 110, code sequence registers 120, receiver 130, sample sequence registers 140, processing unit 150, and correlation output processor 160 may be implemented using any known circuitry or technique. According to an embodiment of the two dimensional correlator 100, the code sequence storage unit 110, code sequence registers 120, receiver 130, sample sequence registers 140, processing unit 150, and correlation output processor 160 all reside on a single semiconductor substrate. For example, the code sequence storage 110, code sequence registers 120, sample sequence registers 140, processing unit 150, and correlation output processor 160 may be implemented using a programmable logic device.

Figure 2:
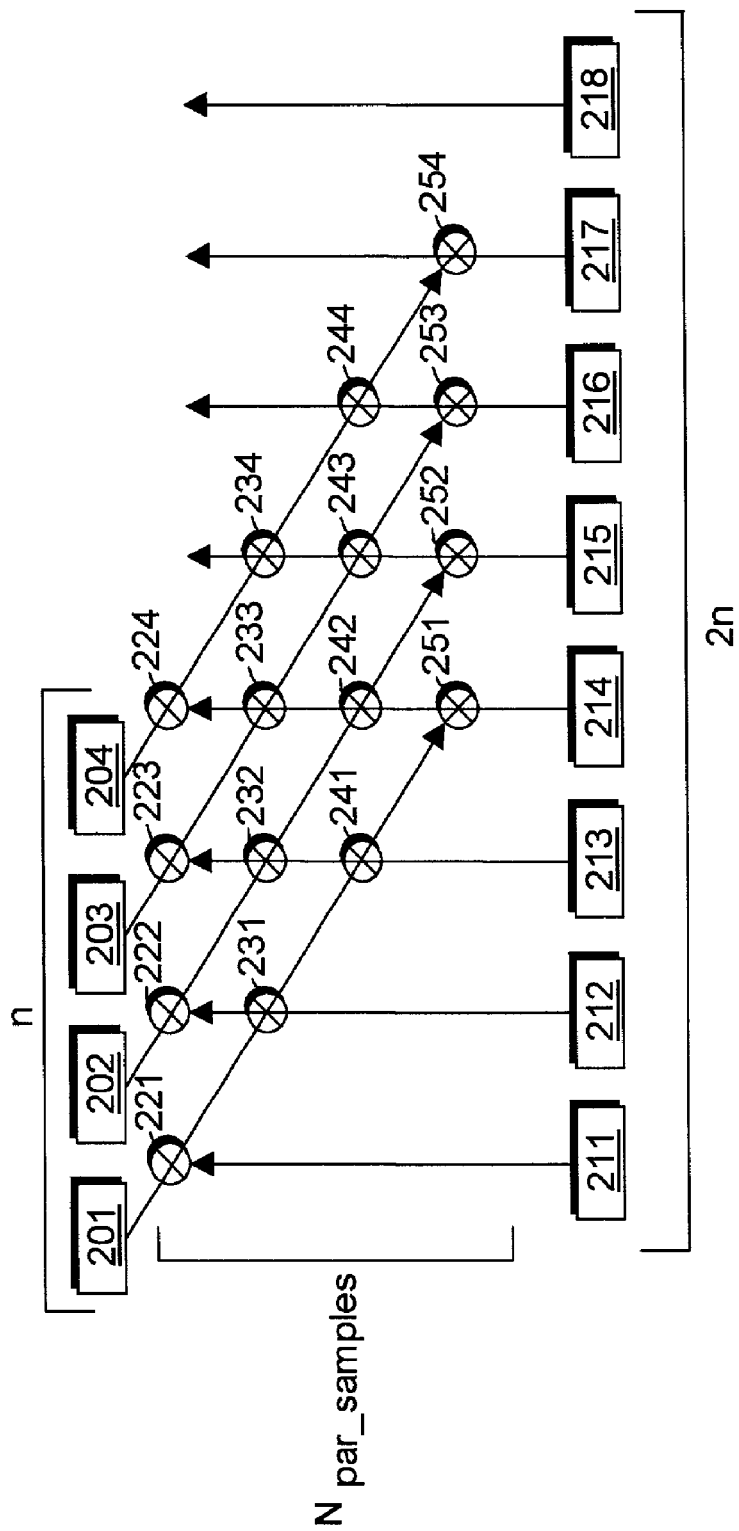
FIG. 2 illustrates conceptually how the two dimensional correlator shown in FIG. 1 processes sample values from a sample with coefficients from a code sequence according to an embodiment of the present invention.

FIG. 2 illustrates conceptually how the two dimensional correlator 100 shown in FIG. 1 processes sample values in a sample with coefficients in a codes sequence according to an embodiment of the present invention. The code sequence stored in the code sequence storage 110 (shown in FIG. 1) may be organized into a plurality of contiguous sets of coefficients each having n coefficients each. The code sequence registers 120 (shown in FIG. 1) store coefficients that are to be processed during a current time step of the two dimensional correlator 100. Blocks 211–218 represent the code sequence registers 120. In this example, code sequence registers 211–218 are configured to store up to two sets of coefficients where each set has n coefficients each and n is 4. According to an embodiment of the present invention, one set of coefficients is loaded into the code sequence registers at a time. At a first time step, a first set of coefficients is loaded into code sequence registers 211–214. During the first time step, register 214 may store a first coefficient in the code sequence group. Register 213 may store a second coefficient in the code sequence group. Register 212 may store a third coefficient in the code sequence group. Register 211 may store a fourth coefficient in the code sequence group. At a second time step, the coefficients in code sequence registers 211–214 are shifted into code sequence registers 215–218, respectively and a second set of coefficients are loaded into code sequence registers 211–214. During the second time step, register 214 may store a fifth coefficient in the code sequence group. Register 213 may store a sixth coefficient in the code sequence group. Register 212 may store a seventh coefficient in the code sequence group. Register 211 may store an eighth coefficient in the code sequence group. If additional sets of coefficients exists, the coefficients stored in code sequence registers 211–214 may be shifted into code sequence registers 215–218 at a third time step to make room for a third set of coefficients. This process may proceed until all sets of coefficients have been loaded into the code sequence registers 211–218.

The samples received and stored in receiver 130 (shown in FIG. 1) may be organized into a x+1−L contiguous sample sequences, where L is the number of coefficients in a coefficient sequence and x is the number of values in the sample. Each of the sample sequences includes a contiguous subset of L values from the sample. According to an embodiment of the present invention, a first sample value in a first sample sequence includes a first sample value from the sample and each consecutive sample sequence includes a next contiguous sample value in the sample as a first sample value in the consecutive sample sequence. Each sample may also be organized into a plurality of contiguous sets of contiguous sample values having n sample values each. The sample sequence registers 140 (shown in FIG. 1) store a set of sample values at a time. The set of sample values include sample values from $N_{par\_sample}$ sample sequences groups that are to be processed in parallel during a current clock cycle of the two dimensional correlator 100. Blocks 201–204 represent the sample sequence registers 140. In this example, the sample sequence registers 201–204 are configured to store n sample values where n is 4. During a first time step, registers 201–204 may store sample values from a first sample sequence. Equivalently, samples could be stored in registers 211–218, and code sequence coefficients could be stored in registers 201–204.

Nodes 221–224, 231–234, 241–244, and 251–254 illustrate how the processing unit 150 (shown in FIG. 1) processes the values stored in the sample sequence registers 201–204 with the coefficients stored in the code sequence registers 211–218. Nodes 221–224 illustrate the calculations performed between coefficients stored in the code sequence registers 211–214 and the sample values stored in the sample sequence reference 201–204. Nodes 231–234 illustrate the calculations performed between coefficients stored in the code sequence registers 212–215 and the sample values stored in the sample sequence reference 201–204. Nodes 241–244 illustrate the calculations performed between coefficients stored in the code sequence registers 213–216 and the sample values stored in the sample sequence reference 201–204. Nodes 251–254 illustrate the calculations performed between coefficients stored in the code sequence registers 214–217 and the sample values stored in the sample sequence reference 201–204. According to an embodiment of the processing unit 150, the calculations include multiplications yielding partial accumulation results.

After processing for the values stored in sample sequence registers 201–204 with the coefficients stored in code sequence registers 211–218, sample sequence registers 201–204 store sample values from a next set of sample values. Code sequence registers 215–218 store coefficients previously stored in code sequence registers 211–214, respectively and code sequence registers 211–214 store coefficients from a next set of coefficients. Calculations are performed by the processing unit 150 until the last sample value in the last sample sequence is processed with its corresponding coefficient for the first set of $N_{par\_sample}$ sample sequences. Thereafter, if additional sets of sample sequences have not been processed, the code sequence registers 211–218 and the sample sequence registers 201–204 continue to load coefficients and samples for the processing unit 150 to process.

The present invention utilizes time division multiplexing by processing coefficients and values from $N_{par\_sample}$ sample sequences in parallel. This allows the two dimensional correlator 100 to reduce the number of registers required for calculating correlation outputs. Instead of utilizing L sample sequence registers for storing sample values, the two dimensional correlator 100 utilizes n sample sequence registers. By processing only a subset of the code sequence and subset of the sample sequence during a time step, the two dimensional correlator 100 need not implement registers for storing all the values at one time. By processing a subset of $N_{par\_sample}$ sample sequences in parallel, the two dimensional correlator 100 is also reducing the input/output (I/O) bandwidth required from L to $N_{par\_sample}$.

It should be appreciated that the number of sample sequences, $N_{par\_sample}$, to process in parallel and the number of values to assign in a set of sample value and coefficients to a set of coefficients, n, may be selected to optimize the performance of the two dimensional correlator 100.

FIG. 2 illustrates exemplary code sequence registers 211–218 that store 8 coefficients during a clock cycle and exemplary sample sequence registers 201–204 that store 4 sample values during a clock cycle. It should be appreciated that the two dimensional correlator 100 may implement code sequence registers that store any number of coefficients and sample sequence registers that store any number of sample values. FIG. 2 also illustrates nodes 221–224, 231–234, 241–244, and 251–254 that represent calculations that are performed by the processing unit 150 where the calculations are multiplications. It should be appreciated that the two dimensional correlator 100 may implement a processing unit 150 that performs other calculations and that each of the illustrated nodes 221–224, 231–234, 241–244, and 251–254 may represent a single or multiple calculations that may include functions other than multiplication.

Figure 3:
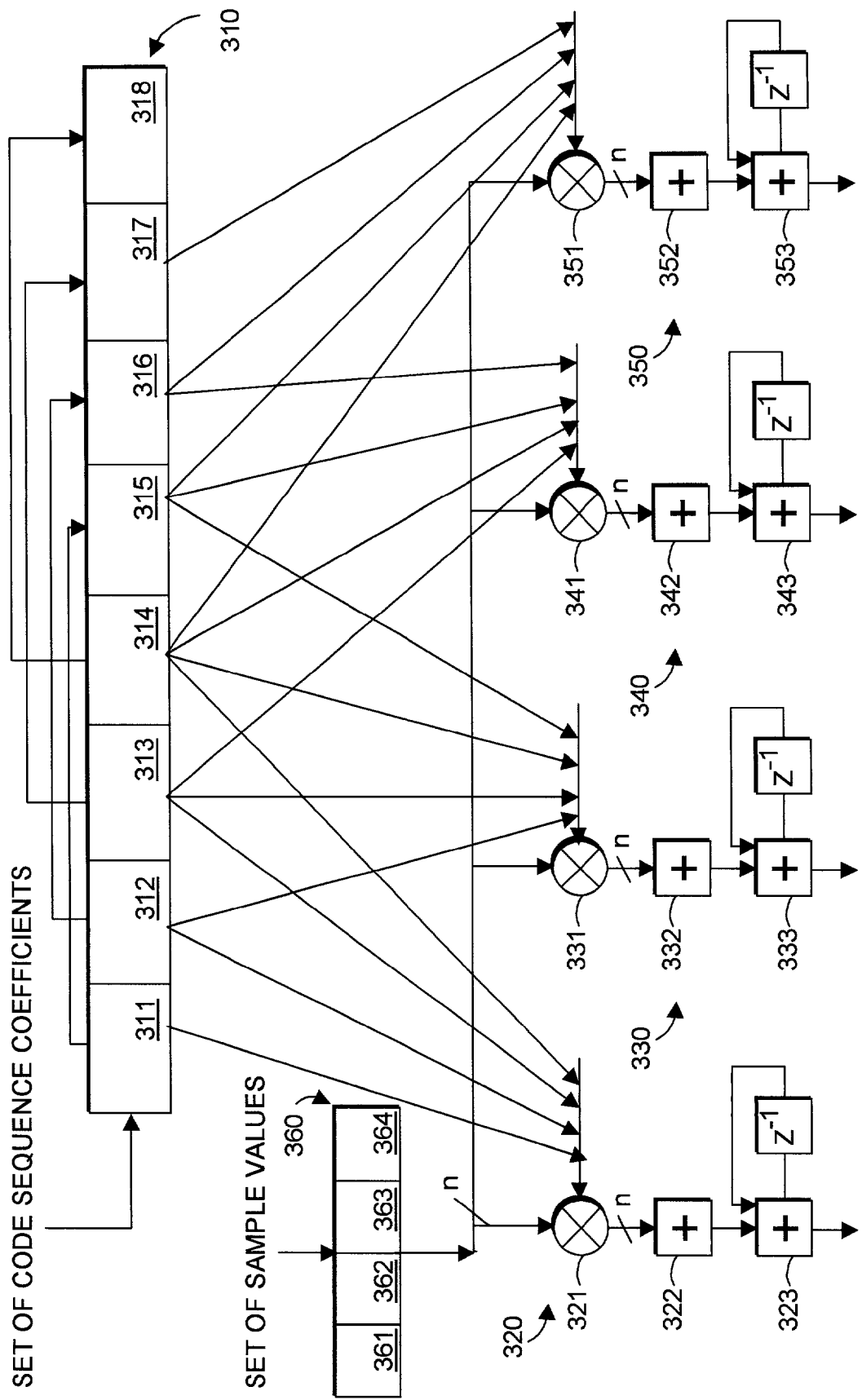
FIG. 3 illustrates a conceptual embodiment of components of the two dimensional correlator shown in FIG. 1 according to one embodiment of the present invention.

FIG. 3 is a conceptual illustration of components of the two dimensional correlator 100 shown in FIG. 1 according to an embodiment of the present invention. In this embodiment, the two dimensional correlator 100 is configured to process 4 sample values and 4 sample sequences in parallel. It should be appreciated, however, that the components of the two dimensional correlator 100 may be modified to process any number of sample values and any number of sample sequences in parallel.

Code sequence registers 310 may be used to implement the code sequence registers 120 shown in FIG. 1. The code sequence registers 310 includes registers 311–318 where register 318 is given the designation of being the highest order register and register 311 is given the designation of being the lowest order register. Each register may store a coefficient from a set of coefficients. According to an embodiment of the two dimensional correlator 100, a first set of coefficients is shifted into registers 311–314 during a first time step. A first coefficient from the first set of coefficients is shifted into register 314. A second coefficient from the first set of coefficients is shifted into register 313. A third coefficient from the first set of coefficients is shifted into register 312. A fourth coefficient from the first set of coefficients is shifted into register 311. At the following time step, the coefficients stored in registers 311–314 may be shifted into registers 315–318, respectively. A second set of coefficients may be shifted into registers 311–314 during this following time step. Similarly, a first coefficient from the second set of coefficients may be shifted into register 314. A second coefficient from the second set of coefficients may be shifted into register 313. A third coefficient from the second set of coefficients may be shifted into register 312. A fourth coefficient from the second set of coefficients may be shifted into register 311.

Sample sequence registers 360 may be used to implement the sample sequence registers 140 shown in FIG. 1. The sample sequence registers 360 includes registers 361–364 where register 364 is given the designation of being the highest order register and register 361 is given the designation of being the lowest order register. Each of the registers 361–364 may store a sample value from a set of sample values. According to an embodiment of the two dimensional correlator 100, a different set of sample values is shifted into registers 361–364 during each time step. A first sample value from a set of sample values may be shifted into register 364. A second sample value from a set of sample values may be shifted into register 363. A third sample value from a set of sample values may be shifted into register 362. A fourth sample value from a set of sample values may be shifted into register 361.

Sub-correlators 320, 330, 340, and 350 may be used to implement the processing unit 150 shown in FIG. 1. Each sub-correlator 320, 330, 340, and 350 is connected to the sample sequence registers 360 and receives the sample values stored in the sample sequence registers 360 during each time step. Each sub-correlator 320, 330, 340, and 350 is connected to selected registers in the code sequence registers 310 and receives coefficients stored in selected registers in the code sequence registers 310 during each time step. Each sub-correlator 320, 330, 340, and 350 includes a multiplication unit 321, 331, 341, and 351 respectively. Each multiplication unit 321, 331, 341, and 351 multiplies a sample value from each of the sample sequence registers 360 with a coefficient from a corresponding order code sequence register that is connected to its sub-correlator. For example, multiplication unit 321 multiplies a sample value in a highest order register 364 from the sample sequence registers 360 with a coefficient in a highest order register 314 in the code sequence registers 310 that is connected to the sub-correlator 320. Multiplication unit 321 multiplies a sample value in the second highest order register 363 from the sample sequence registers 360 with a coefficient in a second highest order register 313 in the code sequence registers 310 that is connected to the sub-correlator 320. Multiplication unit 321 multiplies a sample value in the third highest order register 362 from the sample sequence registers 360 with a coefficient in a third highest order register 312 in the code sequence registers 310 that is connected to the sub-correlator 320. Multiplication unit 321 multiplies a sample value in the lowest order register 361 from the sample sequence registers 360 with a coefficient in the lowest order register 311 in the code sequence registers 310 that is connected to the sub-correlator 320. Each sub-correlator 320, 330, 340, and 350 includes a first adder unit 322, 332, 342, and 352 respectively. The first adder units 322, 332, 342, and 352 calculate the sum of the products generated by the multiplication units 321, 331, 341, and 351 respectively. Each sub-correator 320, 330, 340, and 350 includes an accumulation unit 323, 333, 343, 353 respectively. The accumulation units 323, 333, 343, and 353 calculate the sum of all the sums generated by the adder units 322, 332, 342, and 352.

By processing a plurality of sample values in parallel, the number of full adder cells required for implementing the two dimensional correlator 100 may be reduced. The number of full adder cells may be calculated as follows.

$$N_{FA} = N_{\text{par\_lags}} \cdot \left[ (N_{bits} + \log_2 L) + \sum_{j=1}^{\log_2 N_{\text{par\_samples}}} 2^{\log_2 N_{\text{par\_samples}} - j} \cdot (N_{bits} + j) \right]$$

The number of clock cycles for calculating the lag results for the sample sequences in a received sample may be calculated as follows.

$$N_{clk} = \frac{N_{lags} \cdot L}{N_{\text{par\_lags}} \cdot N_{\text{par\_samples}}}$$

Where
  $N_{bits}$=Number of bits to represent samples;
  L Code sequence length;
  $N_{\text{par\_lags}}$=Number of time shifted versions of code that are processed concurrently;
  $N_{\text{par\_samples}}$=Number of samples that are processed concurently; and
  $N_{lags}$=Number of time shifted versions of code included in search.

Figure 4:
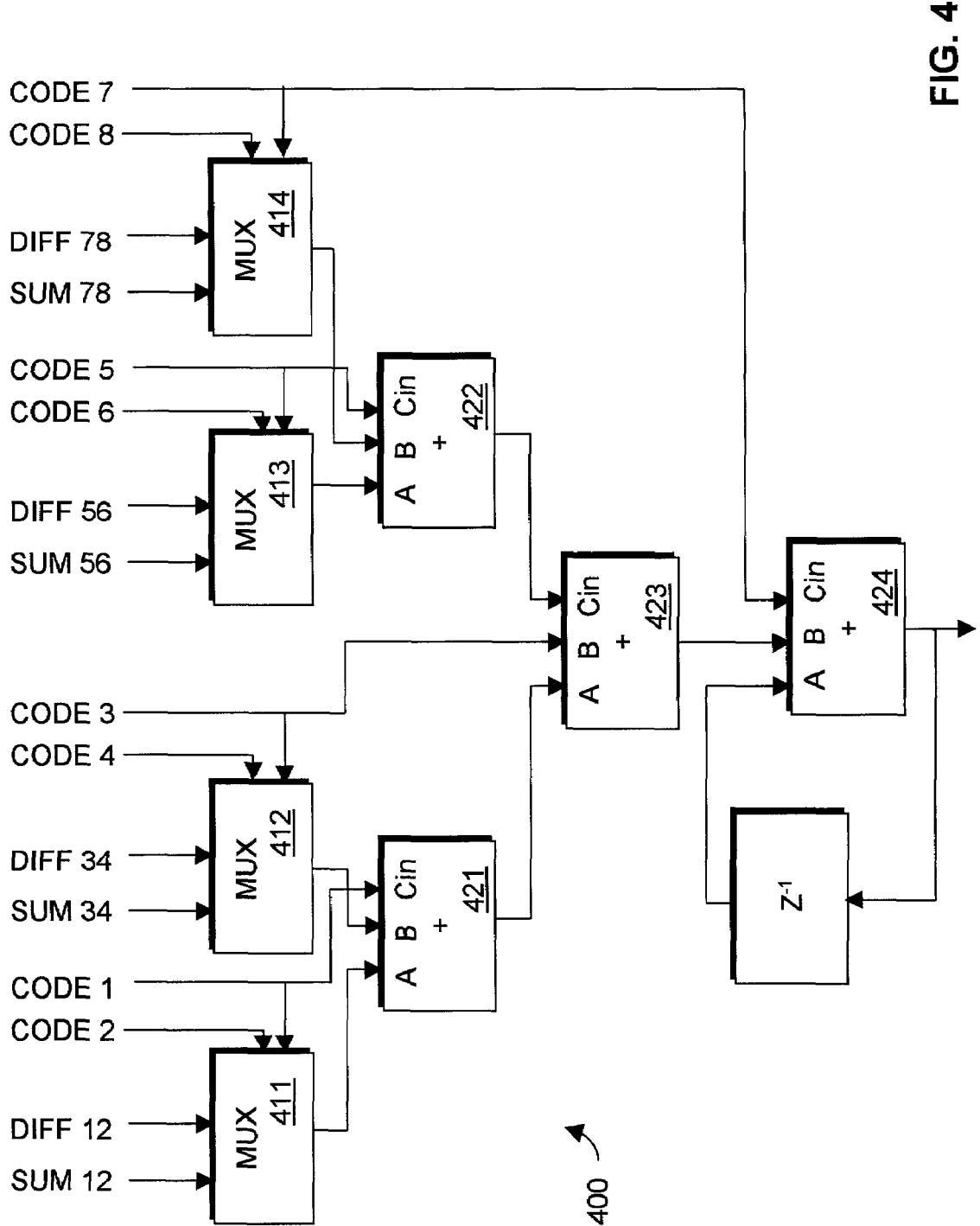
FIG. 4 is a block diagram of components in the processing unit shown in FIG. 1 according to an embodiment of the present invention.

FIG. 4 illustrates an embodiment of an addition-multiplication tree 400 that may be implemented for any of the sub-correlators 320, 330, 340, and 350 shown in FIG. 3. The addition-multiplication tree 400 shown in FIG. 4 is configured to process a sample sequence having 8 values. It should be appreciated, however, that the addition-multiplication tree 400 may be modified to process a sample sequence having any number of values. The addition-multiplication tree 400 includes a plurality of specialized multiplexers 411–414. Each of the specialized multiplexers 411–414 processes two contiguous sample values with their corresponding code sequence coefficients. Specialized multiplexer 411 processes a first and second sample value in a sample sequence with their corresponding coefficients. Specialized multiplexer 412 processes a third and fourth sample value in the sample sequence with their corresponding coefficients. Specialized multiplexer 413 processes a fifth and sixth sample value in the sample sequence with their corresponding coefficients. Specialized multiplexer 414 processes a seventh and eighth sample value in the sample sequence with their corresponding coefficients. Instead of providing sample values to the specialized multiplexers 411–414, the sum and differences of the higher order sample value and the lower order sample value is provided. The addition-multiplication tree 400 includes a plurality of adders 421–424. The adders 421–424 accumulate the results generated by the specialized multiplexers 410–414. According to an embodiment of the addition-multiplication tree 400, code sequence coefficients are converted into code values that are processed by the additional-multiplication tree 400 where positive coefficients ("1") are given a code designation of "0" and negative coefficients ("–1") are given a code designation of "1".

Figure 5:
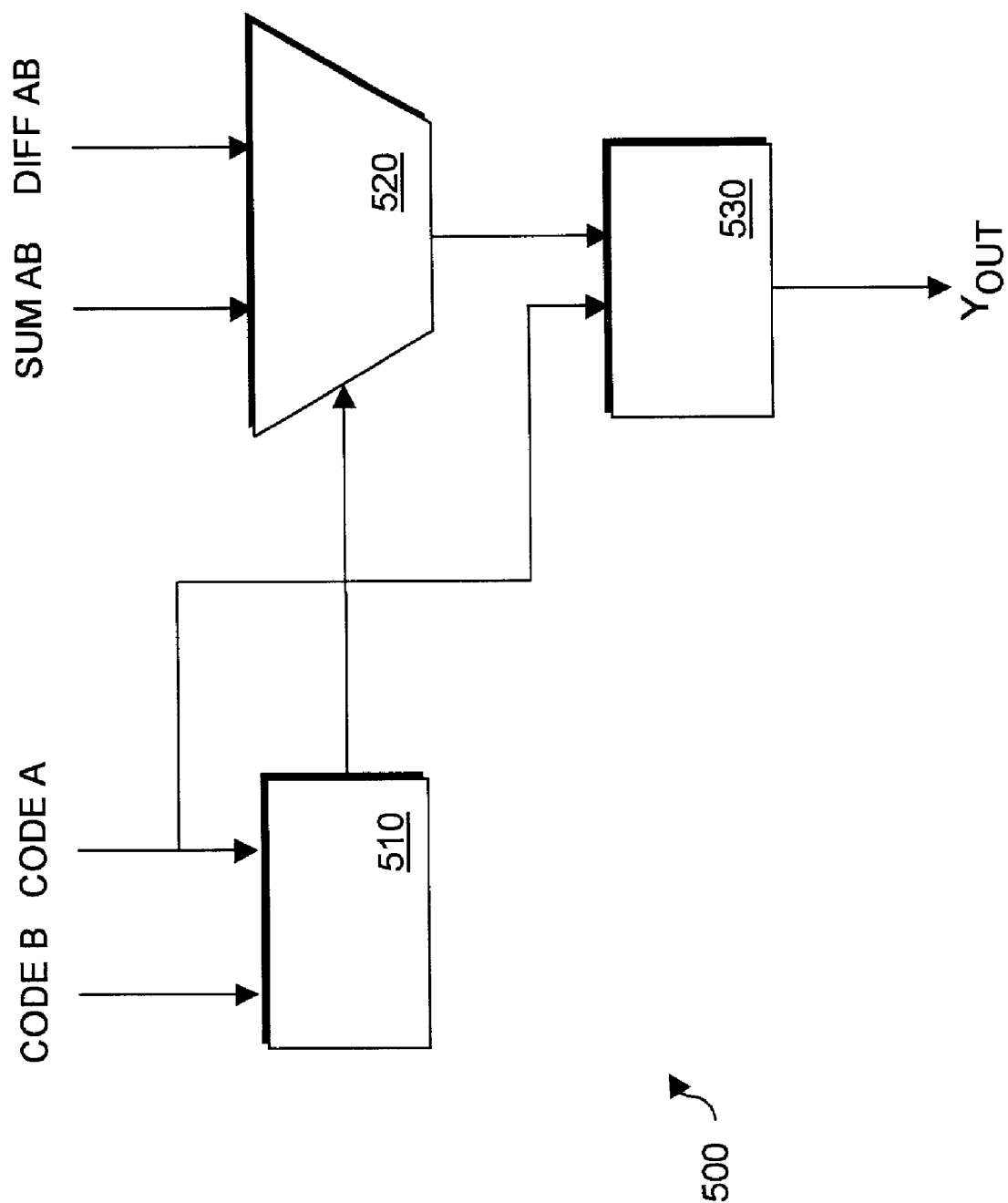
FIG. 5 is a block diagram of a specialized multiplexer shown in FIG. 4 according to an embodiment of the present invention.

FIG. 5 illustrates an embodiment of a specialized multiplexer 500 according to the present invention. The specialized multiplexer 500 may be implemented for any of the specialized multiplexers 411–414 shown in FIG. 5. The specialized multiplexer 500 includes a first circuit 510 that performs an XOR function. The first circuit receives two code sequence coefficients. The specialized multiplexer 500 includes a multiplexer 520. The multiplexer 520 receives a result for the sum of two sample values and the difference for two sample values. The output of the first circuit 510 is coupled to the multiplexer 520. If the output of the first circuit 510 is a 0, the result of the sum of the two sample values is selected to be output by the mulitplexer 520. If the output of the first circuit is 1, the result of the difference of the two sample values is selected to be output by the multiplexer 520. The specialized multiplexer includes a second circuit 530 that performs an XOR function. The second circuit 530 receives the output from the multiplexer and the lower order coefficient received by the first circuit 510.

If the coefficients received by the first circuit 510 match, the sum of the sample values received by the multiplexer is selected by the multiplexer 520. If the coefficients received by the first circuit 520 do not match, the difference between the higher order sample value and the lower order sample value is selected by the multiplexer 520. If the lower order coefficient is a 1, the output of the multiplexer 520 is output of the second circuit 530. If the lower order coefficient is –1, the output of the multiplexer 520 is inverted and output at the second circuit 530.

Referring back to FIG. 4, the results of the specialized multiplexers 411–414 are fed into adders. The output from specialized multiplexers 411 and 412 are fed into adder 421. The output from specialized multiplexers 413 and 414 are fed into adder 422. Taking into consideration that the 2's complement of a number is the inverse of this number plus one, one is added to every result from a specialized multiplexer that is inverted. The lower order coefficients, which indicate whether outputs of a specialized multiplexer are inverted, are thus inputted into the carry_in inputs of the adders in the addition-multiplication tree 400. According to an embodiment of the addition-multiplication tree 400, the lower order coefficient inputted into specialized multiplexer 411 is also inputted into the carry_in input of adder 421. The lower order coefficient inputted into specialized multiplexer 413 is also inputted into the carry_in input of adder 422. The lower order coefficient inputted into specialized multiplexer 412 is also inputted into the carry_in input of adder 423. The lower order coefficient inputted into specialized multiplexer 414 is also inputted into the carry_in input of adder 424. It should be appreciated, that the lower order coefficients inputted into the specialized multiplexers may be connected to the carry_in inputs of the adders according to other arrangements.

The addition-multiplication tree 400 (shown in FIG. 4) utilizes a reduced number of logic elements for the multiplication of sample values with coefficients from code sequences compared to adding and multiplication architectures of the past. The number of logic elements utilized for the multiplication of sample values with coefficients by the addition-multiplication tree 400 is $N_{FA}$.

$$N_{FA} = (N_{bits} + \log_2 L) + \sum_{j=1}^{\log_2 N_{\text{par\_samples}}} 2^{\log_2 N_{\text{par\_samples}} - j} \cdot (N_{bits} + j)$$

Figure 6:
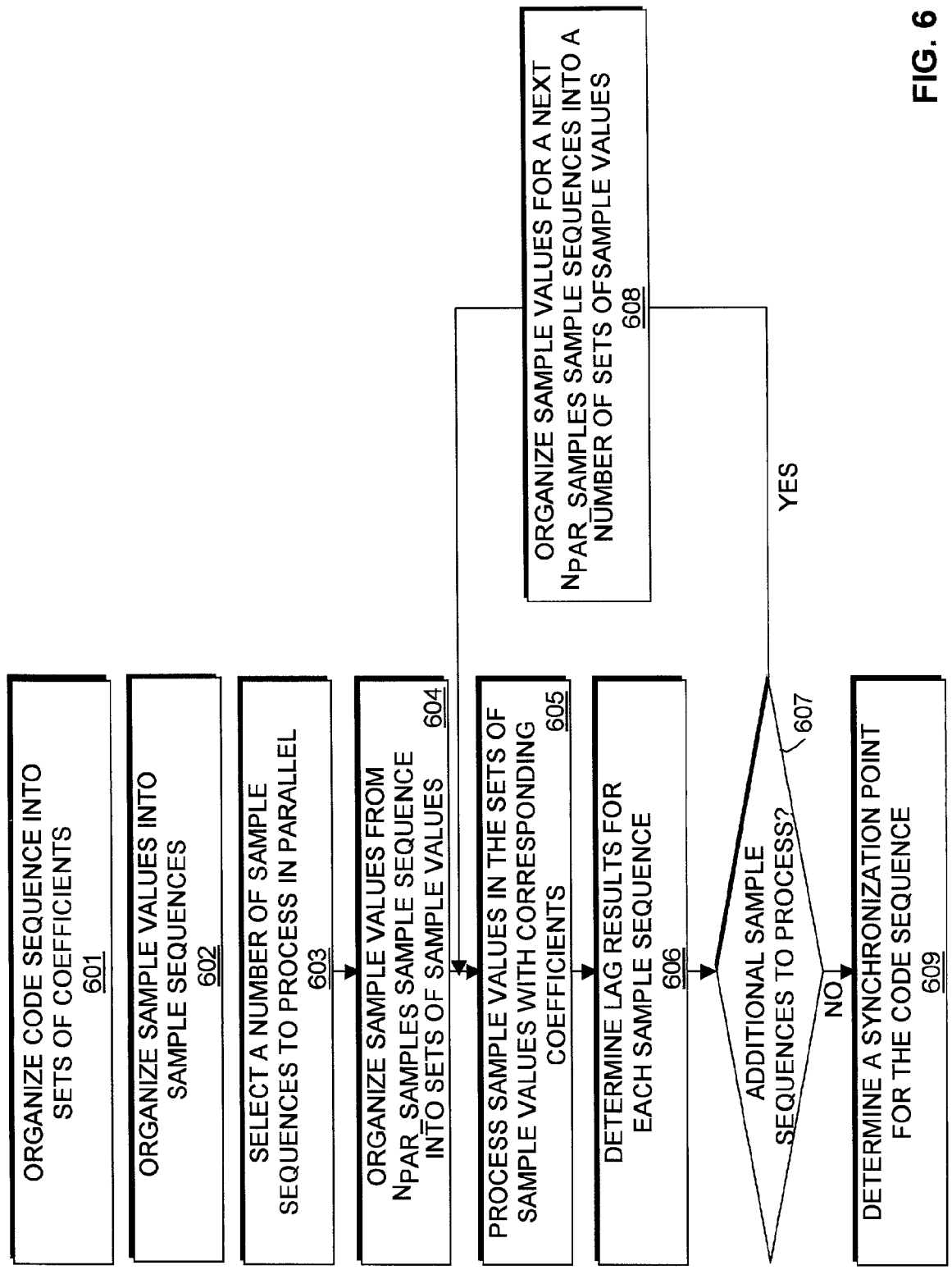
FIG. 6 is a flow chart illustrating a method for managing a code sequence according to an embodiment of the present invention.

FIG. 6 is a flow chart illustrating a method for managing a code sequence according to an embodiment of the present invention. At step 601, a code sequence, having L contiguous coefficients, is organized into a plurality of contiguous sets of contiguous coefficients having n coefficients each.

According to an embodiment of the present invention, the code sequence is organized into L/n sets of coefficients.

At step 602, a received sample, having x contiguous sample values, is organized into a plurality of contiguous sample sequences each having L contiguous sample values. According to an embodiment of the present invention, the received sample is organized into x+1−L contiguous sample sequences where a first sample value in a first sample sequence includes a first sample value from the sample and each consecutive sample sequence includes a next contiguous sample value from the sample as a first sample value in the consecutive sample sequence. Each sample value in a sample sequence corresponds to a coefficient in the code sequence having the same order.

At step 603, a number of $N_{par\_samples}$ sample sequences are selected to process in parallel where each of the sample sequences has L contiguous sample values from a received sample.

At step 604, sample values from each of a set of $N_{par\_samples}$ sample sequences are organized into a number of contiguous sets of contiguous sample values having n values each. According to an embodiment of the present invention, the number of contiguous sets of sample values in $N_{par\_sample}$ sample sequences is the rounded up result of $(L+N_{par\_samples}-1)/n$.

At step 605, sample values in each set of sample values are processed in parallel with corresponding coefficients. Each set of sample values is processed during a different time step. According to an embodiment of the present invention, processing includes determining a sum of the products of the sample values in each set of sample values with corresponding coefficients.

At step 606, a lag result is determined for each of the sample sequences.

At step 607, it is determined whether lag results need to be processed for additional sample sequences. If lag results for additional sample sequences need to be processed, control proceeds to step 608. If lag results need not be processed for additional sample sequences, control proceeds to step 609.

At step 608, sample values for a next $N_{par\_samples}$ sample sequences are organized into a number of contiguous sets of contiguous sample values having n values each. It should be appreciated that the set may include less than $N_{par\_samples}$ sample sequences. Control proceeds to step 605.

At step 609, a synchronization point for the code sequence is determined from the lag results. According to an embodiment of the present invention, determining a synchronization point comprises determining a lag result having a highest numerical value.

Figure 7:
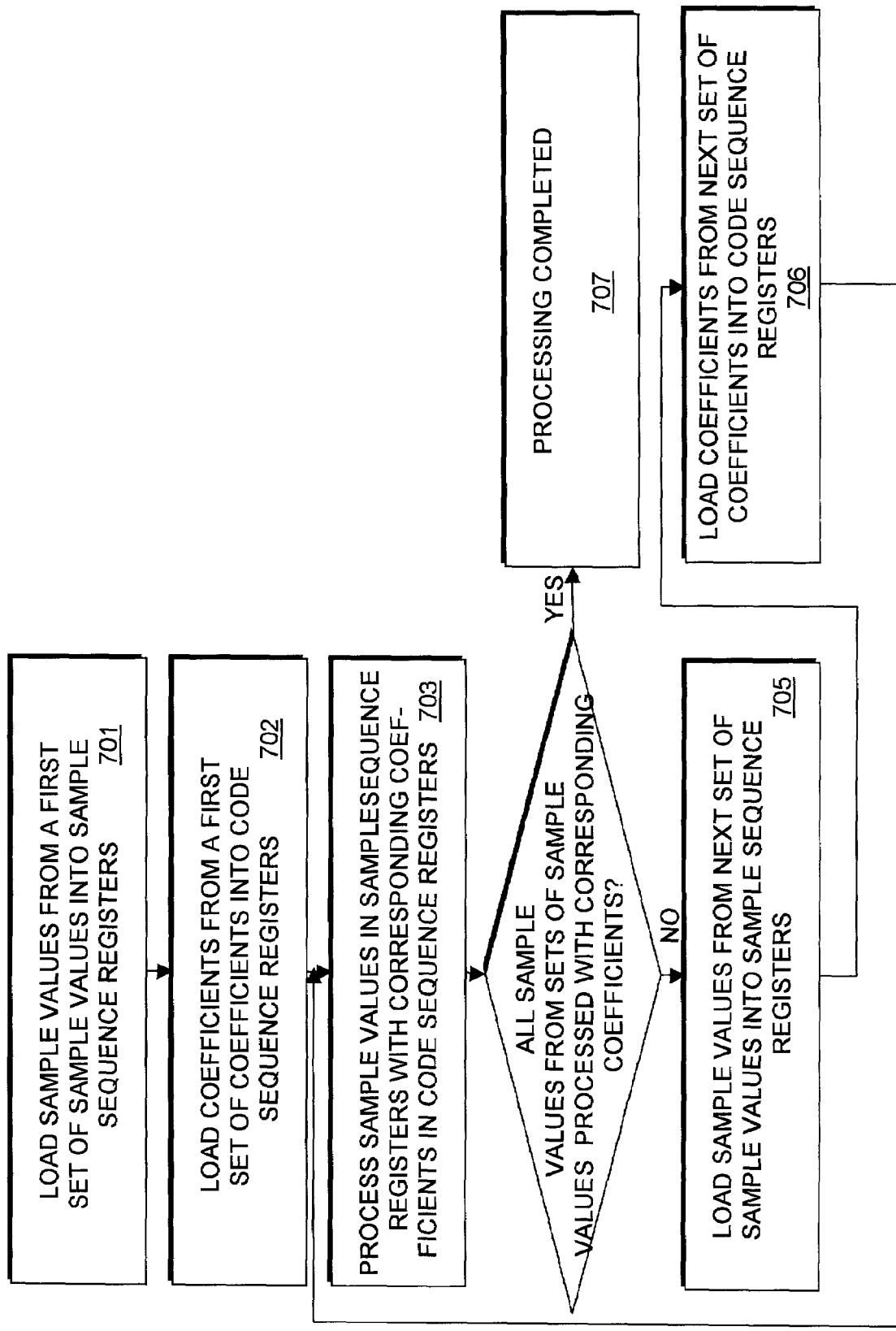
FIG. 7 is a flow chart illustrating a method for processing sample values in a sample with coefficients according to an embodiment of the present invention.

FIG. 7 is a flow chart illustrating a method for processing sample values from a set of sample values with coefficients from a set of coefficients, as described in step 605 of FIG. 6, according to an embodiment of the present invention. At step 701, sample values from a first set of sample values are loaded into sample sequence registers. According to an embodiment of the present invention, $n+N_{par\_samples}-1$ sample values are loaded into the sample sequence registers.

At step 702, coefficients from a first set of coefficients are loaded into code sequence registers. According to an embodiment of the present invention, n coefficients are loaded into the code sequence registers.

At step 703, sample values in the sample sequence registers are processed in parallel with corresponding coefficients in the code sequence registers. Partial accumulation results are determined for each sample sequence from the processing.

At step 704, it is determined whether all the sample values from the sets of sample values have been processed with their corresponding coefficients from the sets of coefficients. If not all the sample values from the sets of sample values have been processed with their corresponding coefficients from the sets of coefficients, control proceeds to step 705. If all the sample values from the sets of sample values have been processed with their corresponding coefficients from the sets of coefficients, control proceeds to step 707.

At step 705, sample values from a next contiguous set of sample values are loaded into the sample sequence registers.

At step 706, coefficients from a next contiguous set of coefficients are loaded into the code sequence registers. Control proceeds to step 703.

At step 707, control determines that processing of the sample values is completed.

FIGS. 6 and 7 illustrate flow charts describing a method for managing a code sequence and a method for processing sample values from a set of sample values with coefficients from a set of coefficients according to embodiments of the present invention. Some of the steps illustrated in these figures may be performed sequentially, in parallel or in an order other than that which is described. It should be appreciated that not all of the steps described are required to be performed, that additional steps may be added, and that some of the illustrated steps may be substituted with other steps.

FIG. 8 is a table of exemplary coefficients from a code sequence and sample values from a received sample to be processed by the two dimensional correlator 100 shown in FIG. 1. The code sequence includes a plurality of contiguous coefficients 1 −1 −1 1 1 −1 −1 −1 listed from highest to lowest order. The code sequence may be stored in the code sequence storage 110 unit (shown in FIG. 1). In this example, the code sequence has L contiguous coefficients where L equals 8. The code sequence may be organized into a plurality of sets of contiguous coefficients. In this example, the code sequence is organized into two sets of contiguous coefficients having n coefficients each where n equals 4. The first set of code sequence coefficients has the coefficients 1 −1 −1 1. The second set of code sequence coefficients has the coefficients 1 −1 −1 −1.

FIG. 8 also illustrates a plurality of samples having the sample values 5 2 −1 3 6 −6 3 2 8 −3 7. The sample values may be received and stored in receiver 130 (shown in FIG. 1). In this example, the sample has x contiguous sample values where x equals 11. The sample values may be organized into x+1−L contiguous sample sequences where each of the sample sequences includes a contiguous subset of L sample values from the sample. According to an embodiment of the present invention, a first sample value in a first sample sequence includes a first sample value in the sample and each consecutive sample sequence includes a next contiguous sample value in the sample as a first value in the consecutive sample sequence. In this example, a first sample sequence includes the sample values 5 2 −1 3 6 −6 3 2 listed from highest to lowest order. A second sample sequence includes the sample values 2 −1 3 6 −6 3 2 8 listed from highest to lowest order. A third sample sequence includes the sample values −1 3 6 −6 3 2 8 −3 listed from highest to lowest order. A fourth sample sequence includes the sample values 3 6 −6 3 2 8 −3 7 listed from highest to lowest order. Each sample value in a sample sequence corresponds to a coefficient in the code sequence having the same order. The received sample may also be organized into a plurality of sets of contiguous sample values having n sample values each. In this example, the first set of sample values includes sample values 5 2 −1 3. A second set of sample values includes sample values 6 −6 3 2. A third set of sample values includes sample values 8 −3 7.

The two dimensional correlator 100 generates a lag result for each sample sequence. According to an embodiment of the two dimensional correlator 100, the lag result is calculated from the sum of products between sample values from a sample sequence and their corresponding coefficient values from a code sequence. The two dimensional correlator 100 determines the correlation output for each of the sample sequences by processing a plurality of sample values and a plurality of code sequence values in parallel. The code sequence registers 120 (shown in FIG. 1) store values from one code sequence group at a time for processing.

Figure 9A:
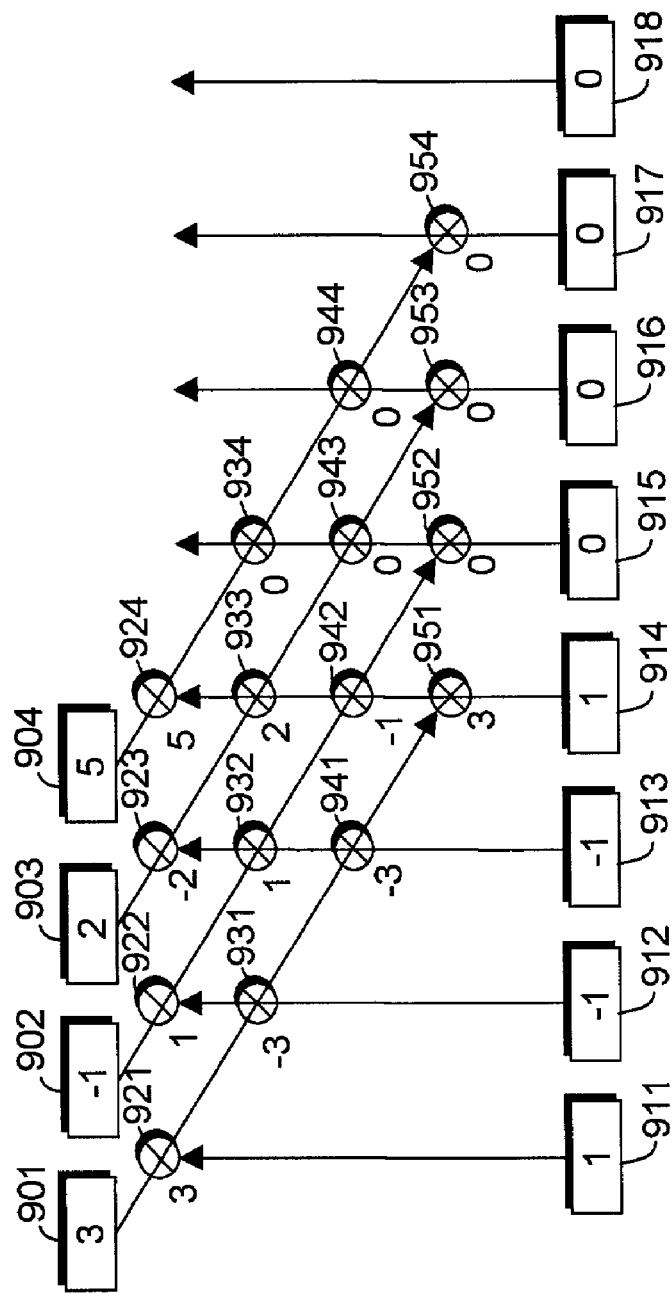
FIG. 9a illustrates an example of how the two dimensional correlator shown in FIG. 1 conceptually manages the code sequence shown in FIG. 8 during a first time step according to an embodiment of the present invention.
Figure 9B:
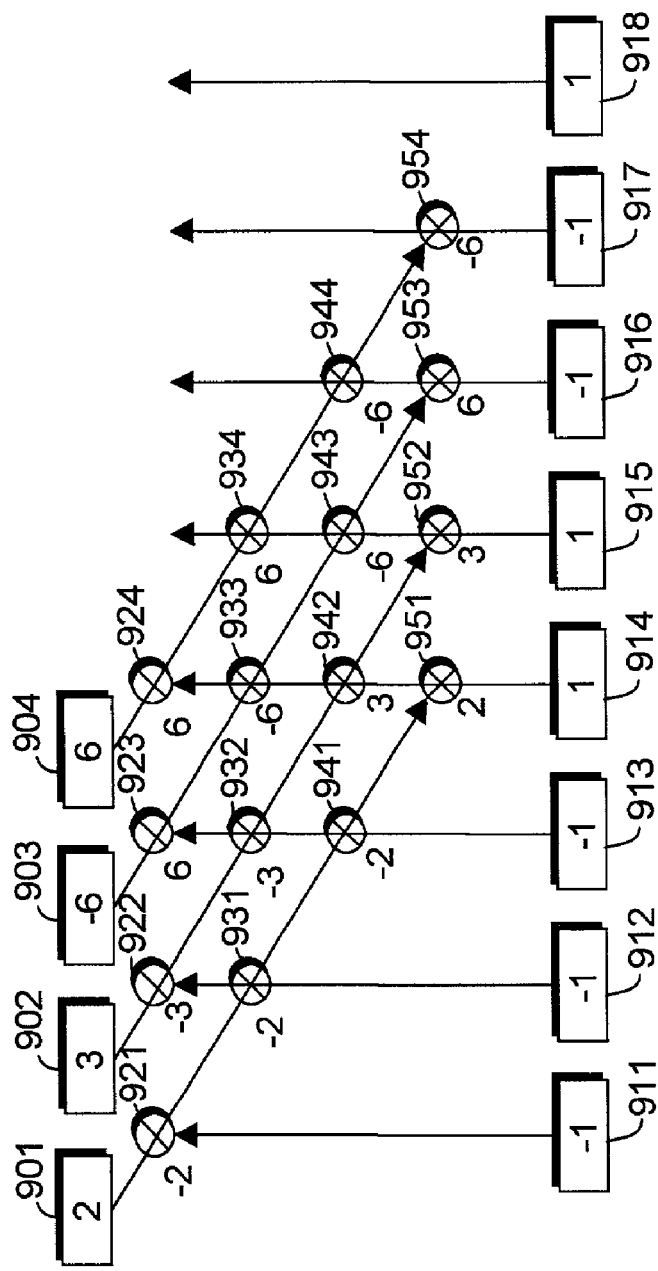
FIG. 9b illustrates an example of how the two dimensional correlator shown in FIG. 1 conceptually manages the code sequence shown in FIG. 8 during a second time step according to an embodiment of the present invention.
Figure 9C:
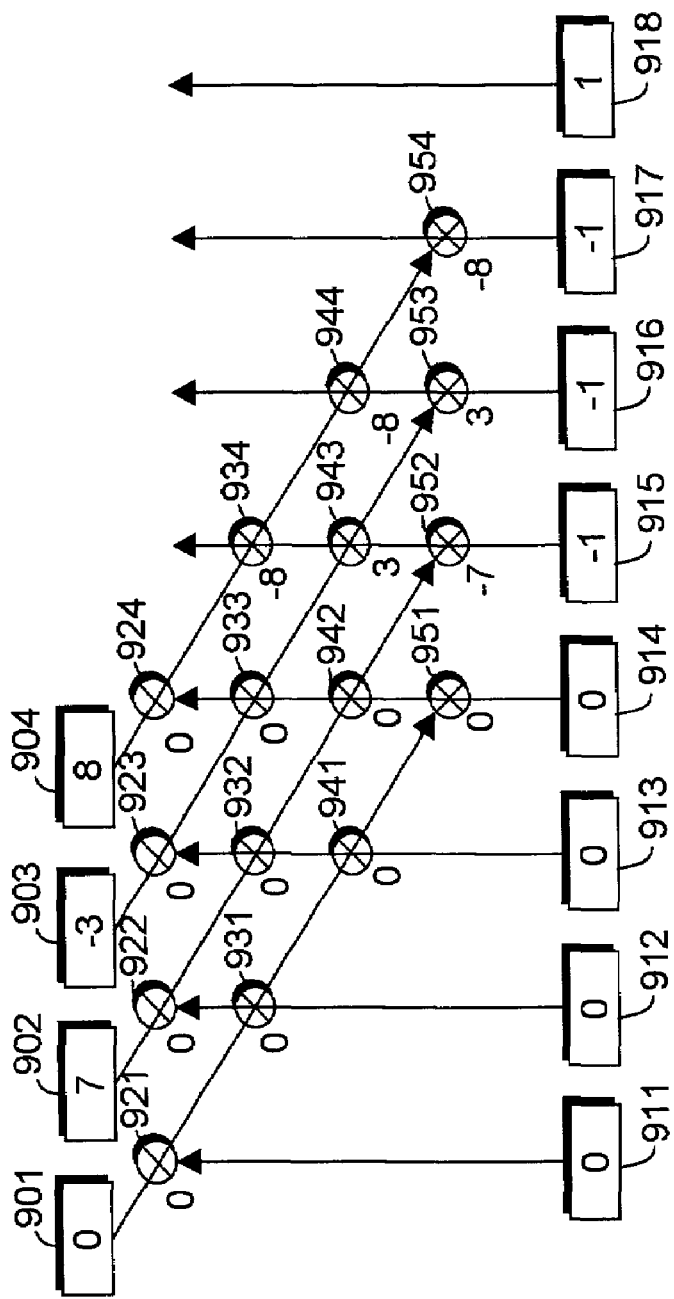
FIG. 9c illustrates an example of how the two dimensional correlator shown in FIG. 1 conceptually manages the code sequence shown in FIG. 8 during a third time step according to an embodiment of the present invention.

FIGS. 9a–c illustrates an example of how the two dimensional correlator 100 shown in FIG. 1 conceptually manages the code sequence shown in FIG. 8 according to an embodiment of the present invention. FIG. 9a illustrates how the two dimensional correlator 100 manages the code sequence during a first time step. During the first clock cycle, sample sequence registers 901–903 store n sample values from a first set of sample values. In this example, n equals 4 and the sample sequence registers 901–904 store the values 3 −1 2 5 from the first set of sample values. The code sequence registers 911–918 are capable of storing 2n coefficients from two sets of coefficients to allow the processing unit 150 (shown in FIG. 1) to process sample values from $N_{par\_samples}$ sample sequences in parallel. In this example, $N_{par\_sample}$ equals 4. According to an embodiment of the present invention, only one set of coefficients are shifted into the code sequence registers 911–918 at each time step. Thus, at the first time step, only a first set of coefficient is shifted into the code sequence registers 911–918. Code sequence registers 911–914 store the coefficients 1 −1 −1 1 from the first set of coefficients. Since no coefficients are shifted into code sequence registers 915–918, zeros are stored in their places.

As shown in FIG. 9a, the processing unit 150 accesses the sample values from the sample sequence registers 901–904 and the coefficients from the code sequence registers 911–918 and multiplies each sample value with its corresponding coefficient. Nodes 921–924, 931–934, 941–944, and 951–954 illustrate the processing performed by the multiplication units 321, 331, 341, and 351 (shown in FIG. 3) respectively at a first time step. For example, in the row containing nodes 921–924, node 921 represents the multiplication performed between the coefficient stored in code sequence register 911 and the sample value stored in sample sequence register 901. Node 922 represents the multiplication performed between the coefficient stored in code sequence register 912 and the sample value stored in sample sequence register 902. Node 923 represents the multiplication performed between the coefficient stored in code sequence register 913 and the sample value stored in sample sequence register 903. Node 924 represents the multiplication performed between the coefficient stored in code sequence register 914 and the sample value stored in sample sequence register 904. The partial accumulation results generated by the calculations represented by nodes 921–924 are 3, 1, −2, and 5 respectively. These partial accumulation results are forwarded to an adder unit 322 (shown in FIG. 3) in sub-correlator 320 (shown in FIG. 3) that generates an accumulation result from summing the partial accumulation results. The accumulation result generated by the adder unit 322 at the first time step is 7, and is added into an accumulator 323 (shown in FIG. 3).

In the row containing nodes 931–934, node 931 represents the multiplication performed between the coefficient stored in code sequence register 912 and the sample value stored in sample sequence register 901. Node 922 represents the multiplication performed between the coefficient stored in code sequence register 913 and the sample value stored in sample sequence register 902. Node 923 represents the multiplication performed between the coefficient stored in code sequence register 914 and the sample value stored in sample sequence register 903. Node 924 represents the multiplication performed between the coefficient stored in code sequence register 915 and the sample value stored in sample sequence register 904. The partial accumulation results generated by the calculations represented by nodes 931–934 are −3, 1, 2, and 0 respectively. These partial accumulation results are forwarded to an adder unit 332 (shown in FIG. 3) in sub-correlator 330 (shown in FIG. 3) that generates an accumulation result from summing the partial accumulation results. The accumulation result generated by the adder unit 332 at the first time step is 0, and is added into an accumulator 333 (shown in FIG. 3).

In the row containing nodes 941–944, node 941 represents the multiplication performed between the coefficient stored in code sequence register 913 and the sample value stored in sample sequence register 901. Node 942 represents the multiplication performed between the coefficient stored in code sequence register 914 and the sample value stored in sample sequence register 902. Node 943 represents the multiplication performed between the coefficient stored in code sequence register 915 and the sample value stored in sample sequence register 903. Node 944 represents the multiplication performed between the coefficient stored in code sequence register 916 and the sample value stored in sample sequence register 904. The partial accumulation results generated by the calculations represented by nodes 941–944 are −3, −1, 0, and 0 respectively. These partial accumulation results are forwarded to an adder unit 342 (shown in FIG. 3) in sub-correlator 340 (shown in FIG. 3) that generates an accumulation result from summing the partial accumulation results. The accumulation result generated by the adder unit 342 at the first time step is −4 and is added into accumulator unit 343 (shown in FIG. 3).

In the row containing nodes 951–954, node 951 represents the multiplication performed between the coefficient stored in code sequence register 914 and the sample value stored in sample sequence register 901. Node 952 represents the multiplication performed between the coefficient stored in code sequence register 915 and the sample value stored in sample sequence register 902. Node 953 represents the multiplication performed between the coefficient stored in code sequence register 916 and the sample value stored in sample sequence register 903. Node 954 represents the multiplication performed between the coefficient stored in code sequence register 917 and the sample value stored in sample sequence register 904. The partial accumulation results generated by the calculations represented by nodes 951–954 are 3, 0, 0, and 0 respectively. These partial accumulation results are forwarded to an adder unit 352 (shown in FIG. 3) in sub-correlator 350 (shown in FIG. 3) that generates an accumulation result from summing the partial accumulation results. The accumulation result generated by the first adder unit 352 at the first time step is 3, and is added into accumulation unit 353 (shown in FIG. 3).

FIG. 9b illustrates how the two dimensional correlator 100 manages the code sequence during a second time step. During the second time step, sample sequence registers 901–904 store the values 2 3 −6 6 from the second set of sample values. The coefficients stored in code sequence registers 911–914 during the first time step are shifted into code sequence registers 915–918 respectively. Code sequence registers 911–914 shift in coefficients –1 –1 –1 1 respectively from the second set of coefficients.

The partial accumulation results generated by the calculations represented by nodes 921–924 during the second time step are –2, –3, 6, and 6 respectively. These partial accumulation results are forwarded to the adder unit 322 in sub-correlator 320 that generates an accumulation result from summing the partial accumulation results. The accumulation result generated by the adder unit 322 at the second time step is 7. The partial accumulation result generated at the second time step is summed with the partial accumulation results generated at the first time step by an accumulator 323, and the intermediate lag result is 14.

The partial accumulation results generated by the calculations represented by nodes 931–934 are –2, –3, –6, and 6 respectively. These partial accumulation results are forwarded to the adder unit 332 in sub-correlator 330 that generates an accumulation result from summing the partial accumulation results. The accumulation result generated by the adder unit 332 at the second time step is –5. The partial accumulation result generated at the second time step is summed with the partial accumulation results generated at the first time step by an accumulator 333, and the intermediate lag result is –5.

The partial accumulation results generated by the calculations represented by nodes 941–944 are –2, 3, –6, and –6 respectively. These partial accumulation results are forwarded to the adder unit 342 in sub-correlator 340 that generates an accumulation result from summing the partial accumulation results. The accumulation result generated by the adder unit 342 at the second time step is –11. The partial accumulation result generated at the second time step is summed with the partial accumulation results generated at the first time step by an accumulator 343, and the intermediate lag result is –15.

The partial accumulation results generated by the calculations represented by nodes 951–954 are 2, 3, 6, and –6 respectively. These partial accumulation results are forwarded to the adder unit 352 in sub-correlator 350 that generates an accumulation result from summing the partial accumulation results. The accumulation result generated by the adder unit 352 at the second time step is 5. The partial accumulation result generated at the second time step is summed with the partial accumulation results generated at the first time step by an accumulator 353, and the intermediate lag result is 8.

FIG. 9c illustrates how the two dimensional correlator 100 manages the code sequence during a third time step. During the third time step, sample sequence registers 902–904 store the values 7 –3 8 from the third set of sample values. Since only three sample values are in the set of sample values, a zero is shifted into sample sequence register 901 in place of the fourth sample value. The coefficients stored in code sequence registers 911–914 during the first time step are shifted into code sequence registers 915–918 respectively. Since all the sets of coefficients have been shifted into the code sequence registers 911–918, zeros are shifted into code sequence registers 911–914 at the third time step.

The partial accumulation results generated by the calculations represented by nodes 921–924 during the second time step are 0, 0, 0, and 0 respectively. These partial accumulation results are forwarded to the adder unit 322 in sub-correlator 320 that generates an accumulation result from summing the partial accumulation results. The accumulation result generated by the adder unit 322 at the third time step is 0. The partial accumulation result generated at the third time step is summed with the partial accumulation results generated at the first and second time step by the accumulator 323. The sum of the partial accumulation results at the third time step is 14 which is the lag result for the first sample sequence.

The partial accumulation results generated by the calculations represented by nodes 931–934 are 0, 0, 0, and –8 respectively. These partial accumulation results are forwarded to the adder unit 332 in sub-correlator 330 that generates an accumulation result from summing the partial accumulation results. The accumulation result generated by the adder unit 332 at the third time step is –8. The partial accumulation result generated at the third time step is summed with the partial accumulation results generated at the first and second time step by the accumulator 333. The sum of the partial accumulation results at the third time step is –13 which is the lag result for the second sample sequence.

The partial accumulation results generated by the calculations represented by nodes 941–944 are 0, 0, 3, and –8 respectively. These partial accumulation results are forwarded to the adder unit 342 in sub-correlator 340 that generates an accumulation result from summing the partial accumulation results. The accumulation result generated by the adder unit 342 at the third time step is –11. The partial accumulation result generated at the third time step is summed with the partial accumulation results generated at the first and second time step by the accumulator 343. The sum of the partial accumulation results at the third time step is –20 which is the lag result for the third sample sequence.

The partial accumulation results generated by the calculations represented by nodes 951–954 are 0, –7, 3, and –8 respectively. These partial accumulation results are forwarded to the adder unit 352 in sub-correlator 350 that generates an accumulation result from summing the partial accumulation results. The accumulation result generated by the adder unit 352 at the third time step is –12. The partial accumulation result generated at the third time step is summed with the partial accumulation results generated at the first and second time step by the accumulator 353. The sum of the partial accumulation results at the third time step is –4 which is the lag result for the fourth sample sequence.

FIG. 10 is a table illustrating the exemplary coefficients and sample values from the code sequence and sample on the table in FIG. 6. FIG. 10 also lists the lag results of the sample sequences. The lag result for a sample sequence is listed below the first sample value in the sample sequence. In this example, the correlation output processor 160 (shown in FIG. 1), would determine that the lag result corresponding to the first sample sequence has the highest magnitude. The correlation output processor 170 would determine that the first sample value in the third sample sequence, –1, is the synchronization point for the code sequence. It should be appreciated that if the sample values are exactly the opposite of the code sequence coefficients, a negative number with a large magnitude is generated. If the sample values are the same as the code, a positive number with a large magnitude is generated. Both may indicate correct synchronization.

Figure 11:
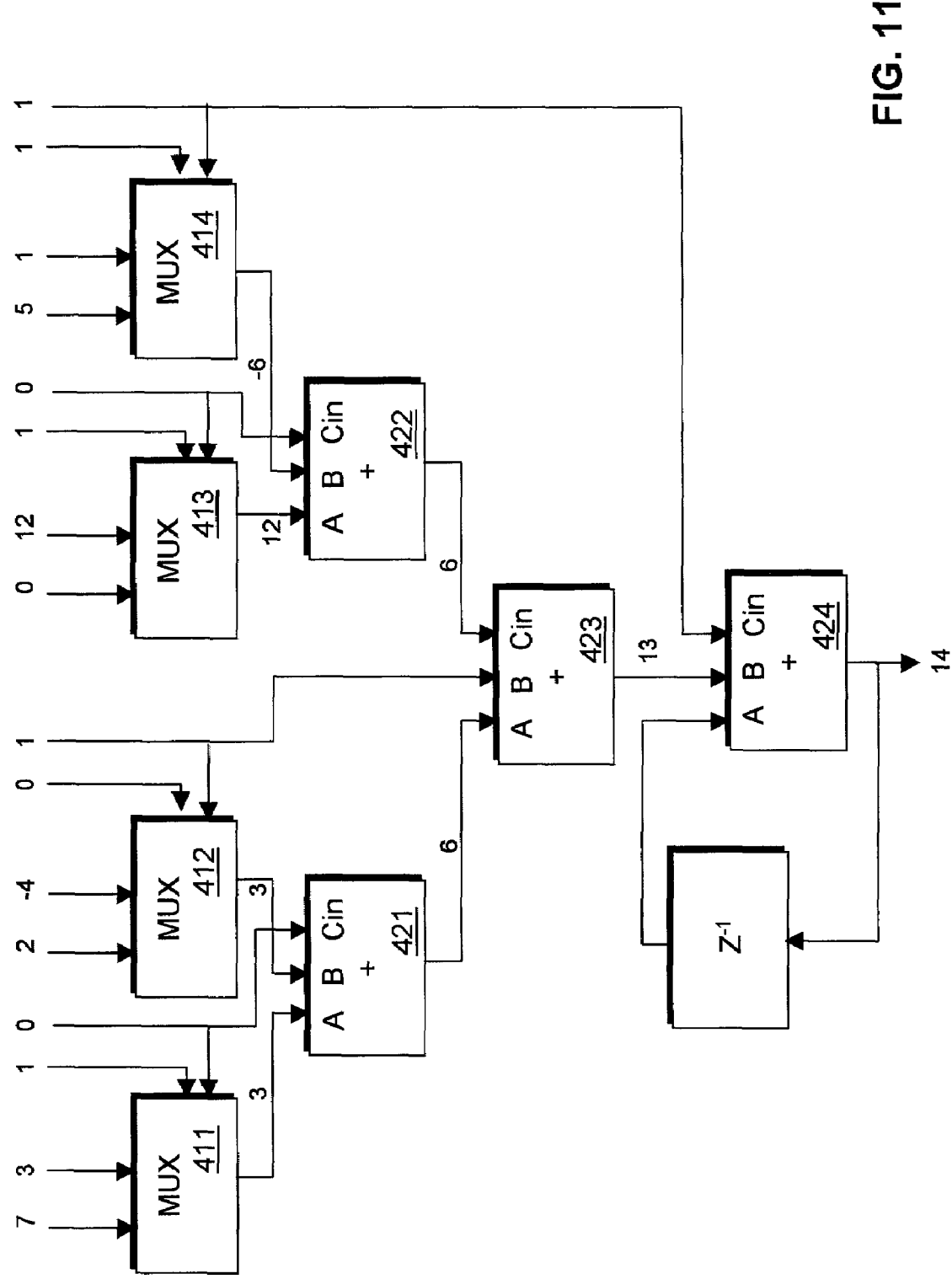
FIG. 11 illustrates the multiplication-addition tree shown in FIG. 4 processing a lag result according to an embodiment of the present invention.

FIG. 11 illustrates an example of the addition-multiplication tree 400 shown in FIG. 4 processing a lag result for the first sample sequence shown in the table of FIG. 8. In this example, the sample sequence has values 5 2 –1 3 6 –6 3 2. The code sequence has values 1 –1 –1 1 1 –1 –1 –1. The sample values are converted into sums and differences. The sum and difference of the first and second sample values are 7 and 3 respectively. The sum and difference of the third and fourth sample values are 2 and −4 respectively. The sum and difference of the fifth and sixth sample values are 0 and 12 respectively. The sum and difference of the seventh and eighth sample values are 5 and 1 respectively. The coefficients in the code sequence are converted into code values. Coefficients 1 −1 −1 1 1 −1 −1 −1 are given the designations 0 1 1 0 0 1 1 1 respectively.

The specialized multiplexer 411 receives as inputs the sum and difference of the first and second sample values in the sample sequence 7 and 3 and code values 0 and 1. Since the code received by the specialized multiplexer 411 are different and the lower order code is a 0, the specialized multiplexer outputs the difference of the first and second sample values, 3. Since the lower order code is a 0, adder 421 does not receive a carry.

The specialized multiplexer 412 receives as inputs the sum and difference of the third and fourth sample values in the sample sequence 2 and −4 and code values 1 and 0. Since the code received by the specialized multiplexer 412 are different and the lower order code is a 1, the specialized multiplexer outputs the inverted difference of the third and fourth sample values. The difference of the third and fourth sample values is −4. In binary, this is 11111100. The inverse of this is 00000011, which has a value of 3 in decimal form. Since the lower order code is a 1, adder 423 receives a carry.

The specialized multiplexer 413 receives as inputs the sum and difference of the fifth and sixth sample values in the sample sequence 0 and 12 and code values 0 and 1. Since the code received by the specialized multiplexer 413 are different and the lower order code is a 0, the specialized multiplexer outputs the difference of the fifth and sixth sample values, 12. Since the lower order code is a 0, adder 422 does not receive a carry.

The specialized multiplexer 414 receives as inputs the sum and difference of the seventh and eighth sample values in the sample sequence 5 and 1 and code values 1 and 1. Since the code received by the specialized multiplexer 411 are the same and the lower order code is a 1, the specialized multiplexer outputs the inverted sum of the seventh and eighth sample values. The sum of the seventh and eighth sample values is 5. In binary, this is 00000101. The inverse of this is 11111010, which has a value of −6 in decimal form. Since the lower order code is a 1, adder 424 receives a carry.

Adder 421 sums the values 3 and 3 from the specialized multiplexer 411 and 412 respectively and generates the result of 6. Adder 422 sums the values 12 and −6 from the specialized multiplexers 413 and 414 respectively and generates the result of 6. Adder 423 sums the values 6 and 6 from adders 421 and 422 respectively and includes a carry from specialized multiplexer 412. Adder 423 generates a result 13. Adder 424 receives the result from adder 423 and includes a carry from specialized multiplexer 414. Adder 424 generates a result 14, which is the lag result for the first sample sequence.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for managing a code sequence, comprising:
    processing a first set of sample values with coefficients from a first set of code sequence coefficients to determine first partial accumulation results during a first time step;
    processing a second set of sample values with coefficients from a second set of code sequence coefficients to determine second partial accumulation results during a second time step;
    processing the second set of sample values with coefficients from the first and second set of code sequence coefficients to determine third partial accumulation results during the second time step;
    generating a lag result for a first sequence of sample values in response to the first and second partial accumulation results; and
    generating a lag result for a second sequence of sample values in response to the first and third partial accumulation results.

2. The method of claim 1, further comprising:
    processing a third set of sample values with coefficients from a third set of code sequence coefficients to determine fourth partial accumulation results during a third time step; and
    updating the lag result for the second sequence of sample values in response to the first, third, and fourth partial accumulation results.

3. The method of claim 1, further comprising determining a synchronization point for the code sequence from the lag results for the first and second sequences of sample values.

4. The method of claim 3, wherein determining a synchronization point comprises determining a lag result from the first and second sequences of sample values having the highest numerical value.

5. The method of claim 1, wherein the first and second set of code sequence coefficients are contiguous coefficients from the code sequence.

6. The method of claim 1, wherein the first and second set of sample values are contiguous sample values in a received sample.

7. The method of claim 1, wherein to determine first partial accumulation results from the first set of sample values with coefficients from the first set of code sequence coefficients during the first time step comprises taking the products of the first set of sample values with the coefficients from the first set of code sequence coefficients.

8. The method of claim 1, wherein generating the lag result for the first sequence of sample values in response to the first and second partial accumulation results comprises taking a sum of the first and second partial accumulation results.

9. A method for managing a code sequence, comprising:
    accessing a first set of n coefficients in the code sequence and a first set of n sample values in a first sample sequence during a first time step;
    processing the first set of n sample values with coefficients in the first set of n coefficients to determine first partial accumulation results;
    accessing a second set of n coefficients in the code sequence and a second set of n sample values in the first sample sequence during a second time step;
    processing the second set of n sample values with coefficients in the second set of n coefficients to determine second partial accumulation results; and
    generating a lag result for the first sample sequence from the first and second partial accumulation results.

10. The method of claim 9, further comprising:
    processing the second set of n sample values with coefficients in the first and second set of n coefficients to determine third partial accumulation results; and
    generating a lag result for a second sample sequence from the first and third partial accumulation results.

11. The method of claim 10, further comprising:
accessing a third set of n sample values during a third time step;
processing the third set of n sample values with coefficients in the second set of n coefficients to determine fourth partial accumulation results; and
updating the lag result for the second sample sequence with the fourth partial accumulation results.

12. The method of claim 9, wherein the first and second set of n coefficients are contiguous code sequence values in the code sequence.

13. The method of claim 9, wherein the first and second set of n sample values are contiguous sample values.

14. The method of claim 9, wherein processing the first set of n sample values with coefficients in the first set of n coefficients to determine the first partial accumulation results comprises taking the products of the first set of n sample values and the coefficients in the first set of n coefficients.

15. The method of claim 9, wherein generating the lag result for the first sample sequence from the first and second partial accumulation results comprises taking a sum of the first and second partial accumulation results.

16. A method for managing a code sequence, comprising:
accessing sets of n contiguous sample values that include sample values in a plurality of sample sequences;
accessing sets of n contiguous corresponding coefficients; and
processing in parallel the sample values in each of a plurality of sets of sample values that are accessed with corresponding coefficients that are accessed, where each of the plurality of sets of sample values are processed during a different time step.

17. The method of claim 16 further comprising generating lag results for each of the plurality of sample sequences.

18. The method of claim 16, wherein each of the sets of n contiguous sample values is accessed at a unique time step.

19. The method of claim 16, wherein each of the sets of n contiguous coefficients is accessed at a unique time step.

20. The method of claim 16, wherein processing the sample values in each of the plurality of sets of sample values with corresponding coefficients comprises generating partial accumulation results.

21. A correlator unit, comprising:
a plurality of n sample sequence registers that store sample values from a plurality of sample sequences that are processed in parallel, the plurality of n sample sequence registers storing sample values from one set of sample values of a plurality of sets of sample values from the plurality of sample sequences at a time;
a plurality of 2n code sequence registers that store up to 2n coefficients from a code sequence; and
a processing unit that processes the sample values in each of the plurality of sets of sample values in the plurality of n sample sequence registers in parallel with corresponding coefficients in the plurality of 2n code sequence registers, where each of the plurality of sets of sample values is processed during a different time step.

22. The correlator unit of claim 21, wherein the processing unit comprises an addition-multiplication tree having a plurality of specialized multiplexers that process contiguous sample values with their corresponding code sequence, and a plurality of adders, coupled to the specialized multiplexers, to accumulate results generated by the specialized multiplexers.

23. The correlator unit of claim 22, wherein the addition-mulitplication tree comprises:
a plurality of specialized multiplexers; and
a plurality of adders.

24. The correlator unit of claim 23, wherein each of the specialized multiplexers, comprises:
a multiplexer; and
a plurality of circuits that perform an XOR function.

* * * * *